UNITED STATES PATENT OFFICE.

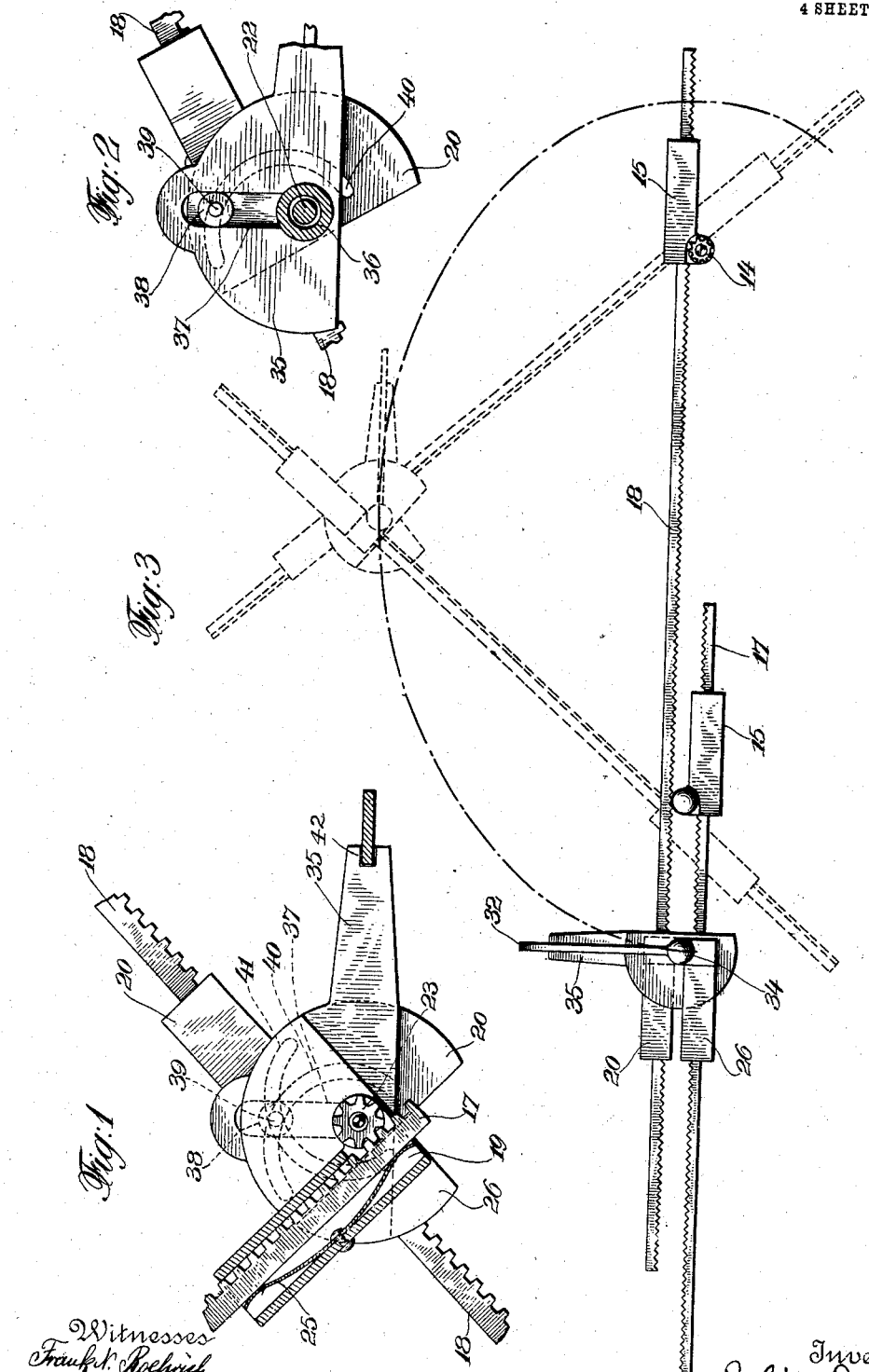

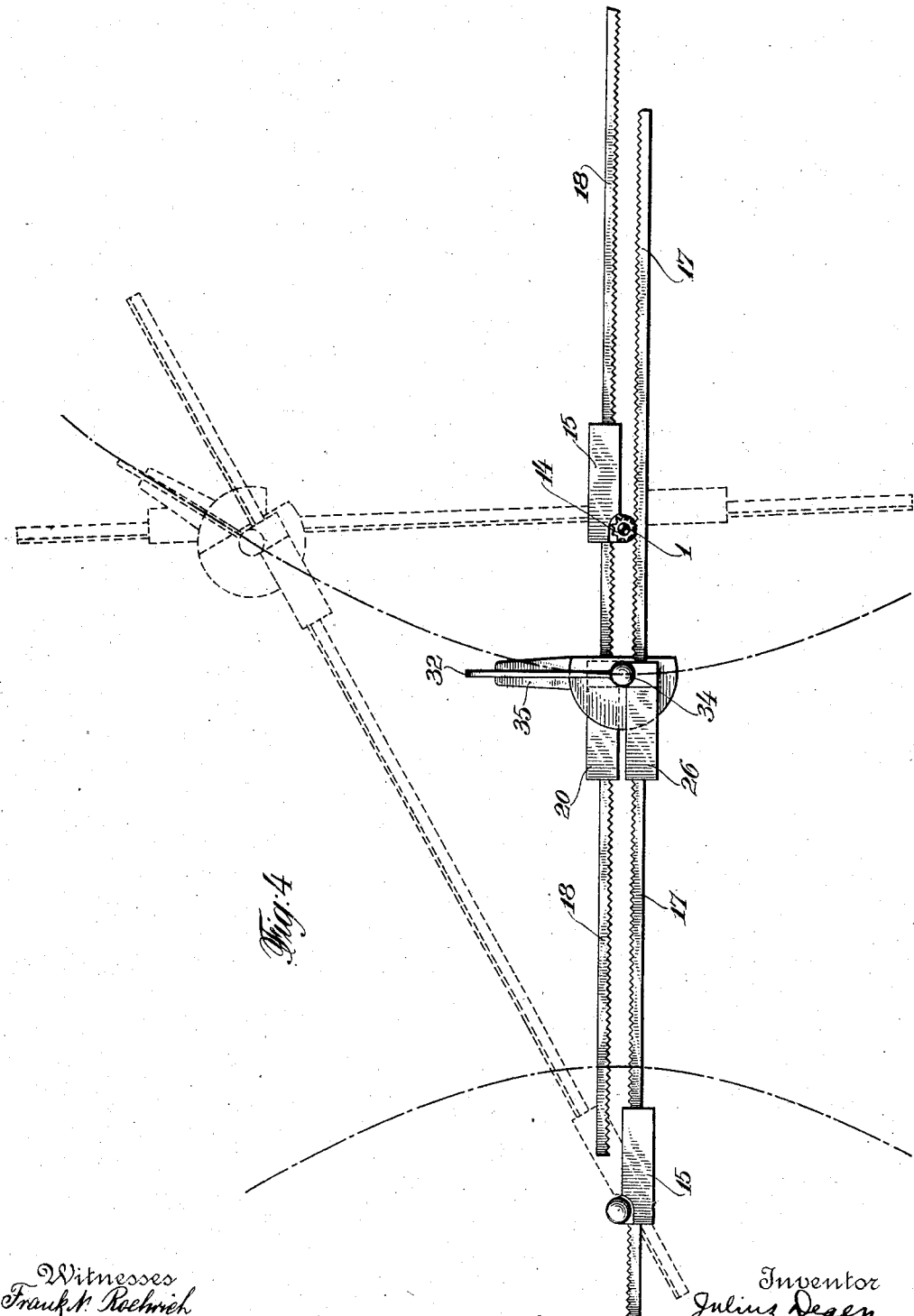

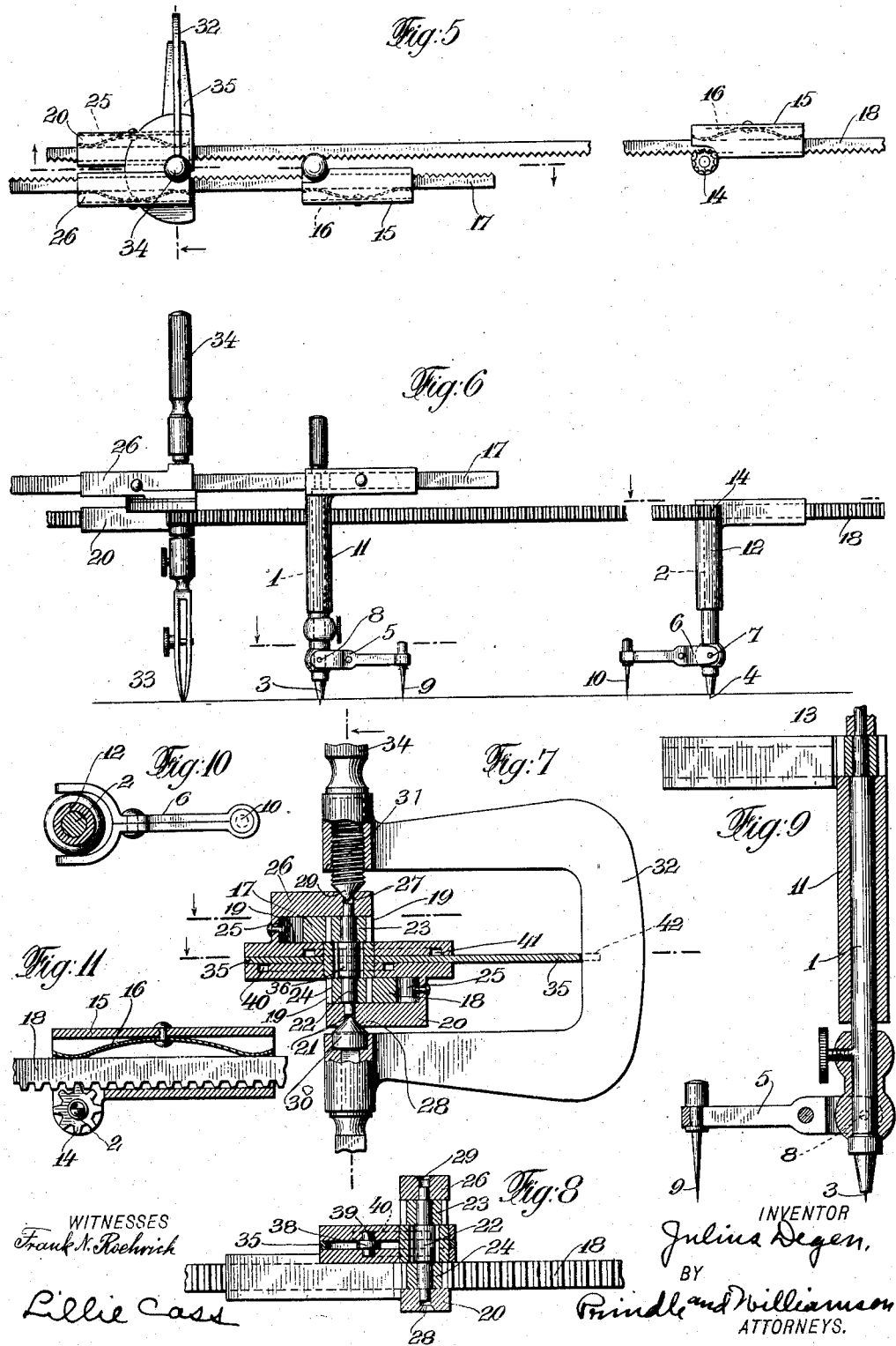

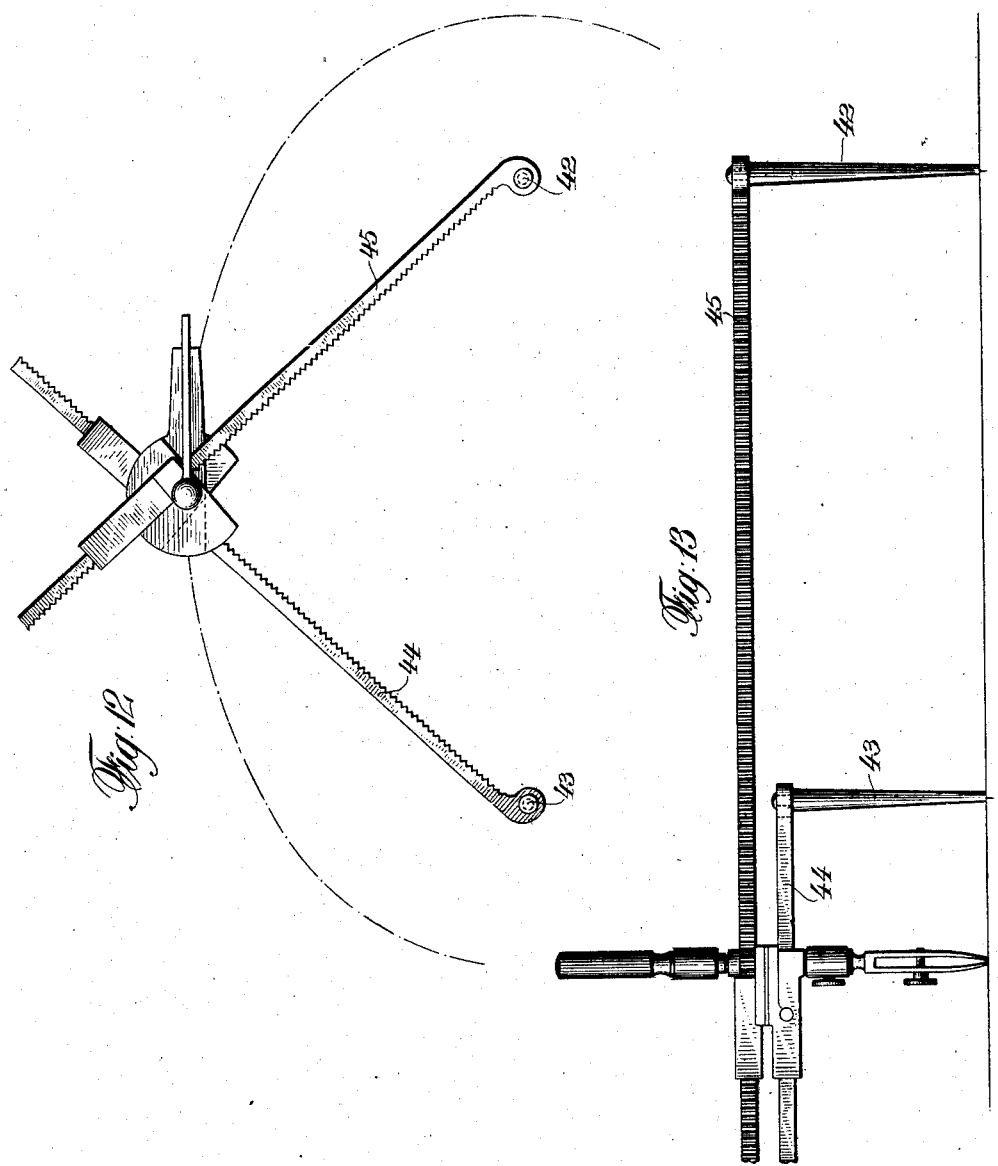

JULIUS DEGEN, OF TRENTON, NEW JERSEY.

DRAWING INSTRUMENT.

No. 864,455.  Specification of Letters Patent.  Patented Aug. 27, 1907.

Application filed October 31, 1906. Serial No. 341,454.

*To all whom it may concern:*

Be it known that I, JULIUS DEGEN, of Trenton, in the county of Mercer, and in the State of New Jersey, have invented a certain new and useful Improvement in a Drawing Instrument; and do hereby declare that the following is a full, clear, and exact description thereof, reference being had to the accompanying drawings, in which—

Figure 1 is a horizontal sectional view, taken in the plane of the upper rack guide, of the parts directly connected with the pen holder of an ellipsograph embodying my invention; Fig. 2 is a horizontal sectional view taken between the guiding plates for the pen holder of the parts immediately about the pen holder in Fig. 1; Fig. 3 is a plan view of the complete ellipsograph embodying my invention. Fig. 4 is a plan view of a structure embodying my invention in drawing a hyperbola. Fig. 5 is a plan view of that form of our instrument illustrated in Figs. 1 and 4, showing springs in the rack guides; Fig. 6 is a side elevation of Fig. 5; Fig. 7 is an enlarged view, partly in section, of the parts above at the pen holder; Fig. 8 is a view, partly in section, of the racks and rack-guides shown in Fig. 7, the view being taken in a plane at right angles to Fig. 7; Fig. 9 is an enlarged view, partly in section, of one of the posts and attached parts; Fig. 10 is a plan view, partly in section, of the pin-holding parts at the foot of Fig. 9; Fig. 11 is a plan view, partly in section of a rack, rack-guide and pinion.

The object of my invention has been to provide an instrument which is adapted for drawing either an ellipse or hyperbola, and to such ends my invention consists in the drawing instrument hereinafter specified.

My instrument is based on the principle that the sum or the difference respectively of the distances from any point of an ellipse or a hyperbola to the foci of such curve is constant.

In carrying my invention into practice I provide posts 1 and 2 having points 3 and 4 respectively which are adapted to be stuck into the paper at the foci. Forked arms 5 and 6 are pivoted by means of pivots 7 and 8 to the said posts, and such arms are provided with pins 9 and 10 respectively, which can be stuck into the paper to prevent rotation of the posts 1 and 2. Each post 1 and 2 has swiveled upon it a sleeve 11 or 12, and at the upper end of the sleeve the post extends through it, having secured to it a pinion 13 or 14, each sleeve having a guide-way 15 having a rack guided therein and preferably having a spring 16 secured in the guide-way to hold the rack against the pinion. A rack 17 occupies the guide-way of the sleeve 11 and engages the pinion 13, and a rack 18 occupies the guide-way of the sleeve 12 and engages the pinion 14. The rack 18 extends through a slide-way 19 formed in a block 20, and such block has a bore 21 which is adapted to receive the lower end of a stud 22, having on it upper and lower pinions 23 and 24. A spring 25 is provided in the slide-way to hold the rack 18 against the pinion 24. An upper block 26, exactly the reverse of the block 20, is provided, and the rack 17 occupies the slide-way of such block, the upper end of the stud 22 having a bearing in the bore 27 of such upper block. The blocks 20 and 26 respectively have an upper and lower conical seat 28 and 29 which seats are engaged by the conical points or screws 30 and 31 carried by a yoke 32 which has upon its lower end a pen or pencil 33, and upon its upper end a thumb-piece 34. In order to insure that the pen shall always be turned parallel to the curve to be drawn, a plate 35 is swiveled on a sleeve 36 through which passes the stud 22 carrying the two pinions, and such plate has a slot 37 that is engaged by a roller 38, the said roller being mounted upon or formed in one piece with a stud 39 that engages cam slots 40 and 41, which are respectively formed in the blocks 20 and 26. The plate 35 has a notch 42 or other formation by which it engages the yoke 32.

In the use of my instrument for drawing an ellipse, as illustrated in Figs. 1, 2, and 3, the points are set in the foci and the racks are swung to the full line position in Fig. 3. The racks are pressed back out of engagement with their respective pinions, this being permitted by the springs in the slide-way, and the racks are slid along until the distance from the pen to the nearest focus plus half the distance between the foci is equal to half the length of the ellipse desired. The pen is then simply caused to travel around the curve. As the racks 17 and 18 engage opposite sides of their respective pinions, any change in the length of the effective portion of one rack is exactly counter-balanced by an equal but opposite change in the effective length of the opposite rack, so that the sum of the distances from the pen to the foci remains constant and a perfect ellipse results.

When using my instrument to draw an hyperbola, as illustrated in Fig. 4, the points 3 and 4 are stuck in the paper at the foci, and the pen is placed between the foci, the racks being adjusted so that the distance of the pen to the nearest focus shall be correct, and the pen is then caused to travel along the curve. In this case, as with the ellipse, any change in the effective length of one rack is followed by an equal change in the length of the opposite rack, so that the difference of the effective lengths of the racks between the pen and the foci remains constant. In either case the plate 35 is caused by the roller 38 and stud 39 to hold the pen half way between the two racks, which causes the pen to always be in line with the curve to be drawn.

It is obvious that various changes can be made in the above illustrated construction which will embody the principles of my invention in various forms without departure from the spirit of it. For instance, instead of the posts 2 being prevented from revolving and having pinions that engage their respective racks, the said posts may be directly secured to the racks as illustrated in Figs. 12 and 13. In this case the posts 42 and 43 are simply placed at the foci, and the racks 44 and 45 adjusted in the slides at the pen-holder. If the pinions 23 and 24 are in this instance of sufficiently small diameter, the ellipse drawn will be practically, although not theoretically, perfect. The construction in Figs. 12 and 13 is identical with that illustrated in the preceding figures, except that the posts 42 and 43 are directly connected with the racks 44 and 45.

Having thus described my invention, I claim:

1. In a drawing instrument, the combination of two posts adapted to be erected at the foci of a conic section, pinions secured to said posts, a pen holder having a rotatable part, teeth mounted on said part, rack-guides mounted on the pen holder, and racks connecting said pen-holder with the pinions on said posts, whereby the sum or the difference of the distances from said pen to said foci shall remain constant.

2. In a drawing instrument, the combination of posts having teeth and rack guides thereon, said posts being adapted to be set up at the foci of a conic section to be drawn, a pen-holder having a rotatable part having teeth thereon, racks for engaging said teeth, and guides for maintaining said racks in engagement with said teeth, said guides permitting said racks to be detached from said teeth, whereby the instrument may be readily adjusted.

3. In a drawing instrument, the combination of two posts adapted to be set up at the foci of a conic section, pinions secured to said posts, a pen-holder also having a rotatable part having teeth; racks, rack-guides swiveled on said posts and said pen-holder respectively, and yielding means in said rack-guides permitting the disengagement of said racks and said pinions or teeth.

4. In a drawing instrument, the combination of two posts adapted to be set up at the foci of a conic section, pinions secured to said posts, a pen-holder also having a rotatable part having teeth, racks, rack-guides swiveled on said posts and said pen-holder respectively, and a spring in said rack-guides permitting the disengagement of said racks and said pinions or teeth.

5. In a drawing instrument, the combination of posts adapted to be set up at the foci of a conic section, pinions on said posts, a pen-holder having a rotatable part having teeth, racks adapted to engage said pen-holder and said pinions and teeth, rack-guides on said posts and on said pen-holder, and means for keeping said pen-holder midway between the vertical planes of said racks.

6. In a drawing instrument, the combination of two posts having pinions thereon, a pen-holder having rotatable means for engaging racks, rack-guides swiveled to said posts and to said pen-holder, racks mounted in said guides, said rack-guides on said pen-holder having overlapping portions that are provided with oppositely arranged spiral guide-ways, and a projection on the pen-holder adapted to engage said guideways.

7. In a drawing instrument, the combination of posts having rotatable pinions thereon, a pen-holder having means for engaging racks, rack-guides swiveled on said posts and on said pen-holder, racks mounted in said guides, said rack-guides on said pen-holder having overlapping portions that are provided with oppositely arranged spiral guide-ways, a plate mounted between said over-lapping portions and engaging the pen-holder, a pin engaging said spiral guide-ways and a slot in said plate.

8. In a drawing instrument, the combination of posts having pinions thereon, a stud having pinions thereon, rack-guides swiveled on said posts and on said stud, racks engaging said guides, said rack-guides on said studs having overlapping portions that are provided with oppositely arranged spiral guide-ways, a plate mounted between said overlapping portions, a pin engaging said guide-ways and a slot in said plate, a yoke embracing the upper and lower sides of the rack guide-ways on said stud, said yoke being engaged by said plate, and the pen carried by said yoke.

9. In a drawing instrument, the combination of points adapted to be stuck in the paper, racks connected to said points, a pen or pencil holder, and a rotatable part having teeth and rack-guides carried by said holder.

10. In a drawing instrument, the combination of points adapted to be stuck in the paper, racks connected to said points, guides for said racks, said guides being swiveled together, a rotatable part having teeth engaging said racks in said guides, and a pen secured to said guides.

11. In a drawing instrument, the combination of points adapted to be stuck in the paper at the foci of a conic section, racks swinging about such points, a pen or pen-holder, and teeth and rack-guides on said holder engaging said racks.

12. In a drawing instrument, the combination of two stationary pinions fixed above the foci of a conic section, a pen having a pinion secured thereon, racks connecting said pen with said stationary pinions, guides connected to said pinions and engaging said racks whereby the pen is caused to travel along said conic section.

13. In a drawing instrument, the combination of two stationary pinions fixed above the foci of a conic section, guides swiveled on these pinions, a pen having a pinion secured thereon, two guides swiveled on this pinion, and racks connecting said pinion, and guides on the pen with said stationary pinions and guides, whereby the pen is caused to travel along said conic section.

14. In a drawing instrument, the combination of a pen, two guides thereon rotatable around a common axis, a pinion in said guides rotatable around the same axis, racks in said guides engaging said pinion, independent guides shiftable on said racks, pinions carried by said independent guides and engaging said racks, and means to fix said pinions above the foci of the conic section to be drawn.

15. In a drawing instrument, the combination of two posts adapted to be erected at the foci of a conic section, bars connected with said posts, a pen-holder carried by said bars at a point of intersection thereof, and means engaging said bars for maintaining a point on said pen-holder midway between the vertical planes of said bars.

In testimony that I claim the foregoing I have hereunto set my hand.

JULIUS DEGEN.

Witnesses:
  JOHN R. D. BOWER,
  HARRY A. HANNUM.